United States Patent
Yamaguchi

(10) Patent No.: US 8,469,807 B2
(45) Date of Patent: Jun. 25, 2013

(54) GAME DEVICE, GAME CONTROL METHOD, AND INFORMATION MEMORY MEDIUM

(75) Inventor: Takeshi Yamaguchi, Minato-ku (JP)

(73) Assignee: Konami Digital Entertainment Co., Ltd., Minato-Ku, Tokyo (JP)

( * ) Notice: Subject to any disclaimer, the term of this patent is extended or adjusted under 35 U.S.C. 154(b) by 524 days.

(21) Appl. No.: 12/877,285

(22) Filed: Sep. 8, 2010

(65) Prior Publication Data

US 2011/0059794 A1 Mar. 10, 2011

(30) Foreign Application Priority Data

Sep. 10, 2009 (JP) ................................. 2009-208835

(51) Int. Cl.
*A63F 13/00* (2006.01)

(52) U.S. Cl.
USPC .................................. 463/31; 463/30; 463/34

(58) Field of Classification Search
USPC ..................................... 463/30, 31, 32, 33, 34
See application file for complete search history.

(56) References Cited

U.S. PATENT DOCUMENTS

| | | | |
|---|---|---|---|
| 2004/0067048 A1* | 4/2004 | Seo et al. | 386/126 |
| 2005/0019015 A1* | 1/2005 | Ackley et al. | 386/95 |
| 2005/0020359 A1* | 1/2005 | Ackley et al. | 463/31 |

FOREIGN PATENT DOCUMENTS

JP 2000-140438 5/2000

* cited by examiner

*Primary Examiner* — James S McClellan
(74) *Attorney, Agent, or Firm* — Howard & Howard Attorneys PLLC

(57) ABSTRACT

A game device has a playing unit, a receiving unit, and a changeover unit. The playing unit plays any piece of motion image data as play-target motion image data among plural pieces of motion image data. The receiving unit receives an instruction input of specifying a position. The plural pieces of motion image data include motion image data associated with a set of a time period (a changeover time period) in a playing time of the motion image data, a position (a changeover determination position), and any piece of motion image data (changeover motion image data). The changeover unit changes over the play-target motion image data to the changeover motion image data when (a) the changeover time period includes a time point when the instruction input was received, and when (b) the changeover determination position and the position specified through the instruction input both satisfy a predetermined proximity condition.

10 Claims, 12 Drawing Sheets

MOTION IMAGE DATA A

MOTION IMAGE DATA A

FIG. 4

MOTION IMAGE DATA A

| CHANGEOVER TIME PERIOD | CHANGEOVER DETERMINATION POSITION | CHANGEOVER MOTION IMAGE DATA |
|---|---|---|
| 80 SECONDS TO 120 SECONDS | (x1, y1) | MOTION IMAGE DATA B |
| 85 SECONDS TO 110 SECONDS | (x2, y2) | MOTION IMAGE DATA C |
| 90 SECONDS TO 140 SECONDS | (x3, y3) | MOTION IMAGE DATA D |
| ⋮ | ⋮ | ⋮ |

FIG. 7

MOTION IMAGE DATA A

| CHANGEOVER TIME PERIOD | CHANGEOVER DETERMINATION POSITION | | CHANGEOVER MOTION IMAGE DATA |
|---|---|---|---|
| | FIRST | SECOND | |
| 80 SECONDS TO 120 SECONDS | (x1, y1) | (x1', y1') | MOTION IMAGE DATA B |
| 85 SECONDS TO 110 SECONDS | (x2, y2) | (x2', y2') | MOTION IMAGE DATA C |
| 90 SECONDS TO 140 SECONDS | (x3, y3) | (x3', y3') | MOTION IMAGE DATA D |
| : | : | : | : |

MOTION IMAGE DATA A

MOTION IMAGE DATA A

MOTION IMAGE DATA A

FIG. 9

MOTION IMAGE DATA A

| CHANGEOVER TIME PERIOD | CHANGEOVER DETERMINATION POSITION | CHANGEOVER DETERMINATION AREA | CHANGEOVER MOTION IMAGE DATA |
|---|---|---|---|
| 80 SECONDS TO 120 SECONDS | (x1, y1) | AREA 1 | MOTION IMAGE DATA B |
| 85 SECONDS TO 110 SECONDS | (x2, y2) | AREA 2 | MOTION IMAGE DATA C |
| 90 SECONDS TO 140 SECONDS | (x3, y3) | AREA 3 | MOTION IMAGE DATA D |
| ⋮ | ⋮ | ⋮ | ⋮ |

FIG. 12
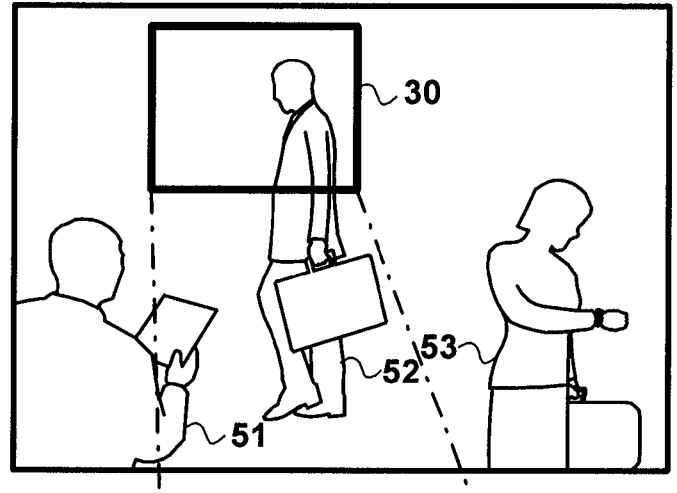
MOTION IMAGE DATA A
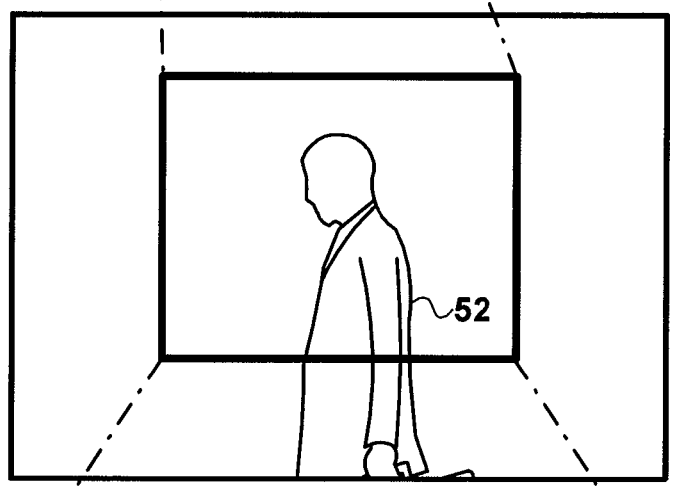
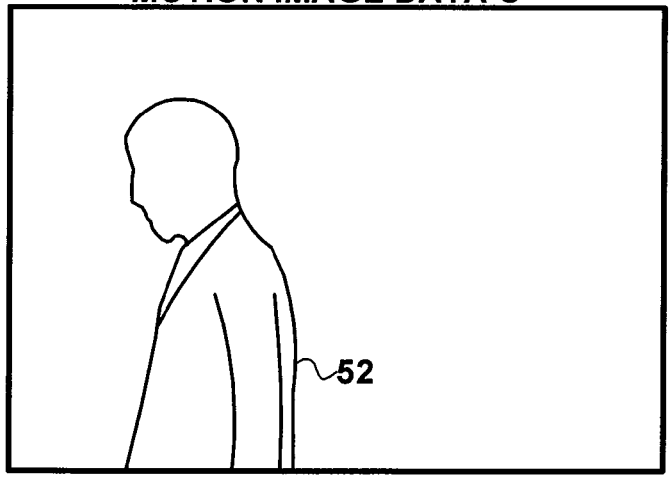
MOTION IMAGE DATA C

GAME DEVICE, GAME CONTROL METHOD, AND INFORMATION MEMORY MEDIUM

CROSS-REFERENCE TO RELATED APPLICATION

This application claims the benefit of Japanese Patent Application 2009-208835, filed on Sep. 10, 2009, the entire disclosure of which is incorporated by reference herein.

FIELD OF THE INVENTION

The present invention relates to a game device and a game control method which enable natural changeover of a motion image to be played next through specifying a position in a screen where a motion image is being played, and an information memory medium.

BACKGROUND OF THE INVENTION

Conventionally, adventure games using a branching scenario are known. Among such adventure games, as disclosed in Unexamined Japanese Patent Application KOKAI Publication No. 2000-140438, there is an adventure game with a story which changes by allowing a player to select a certain option among plural options displayed in a game screen.

SUMMARY OF THE INVENTION

In games which develop a story by playing a motion image, however, there is a demand for a technology of not causing a player to make a selection of any of options explicitly displayed in a screen, but of causing the player to make a selection for a branch through a technique which matches the playing of the motion image.

The present invention is made in order to overcome the foregoing problem, and it is an object of the present invention to provide a game device and a game control method which enable natural changeover of a motion image to be played next through specifying a position in a screen where a motion image is being played, and an information memory medium.

A game device according to a first aspect of the present invention comprises a playing unit, a receiving unit, and a changeover unit, and is configured as follows.

The playing unit plays any piece of motion image data in a screen as play-target motion image data among plural pieces of motion image data.

For example, the plural pieces of motion image data each has a different story, and the playing unit plays any piece of motion image data and a story progresses.

The receiving unit receives an instruction input of specifying a position in the screen.

That is, a player specifies a position in the screen where motion image data is being played, and the receiving unit receives the specifying as an instruction input.

The changeover unit changes over the play-target motion image data based on the received instruction input.

Moreover, the plural pieces of motion image data include motion image data associated with a set of a time period (hereinafter, a "changeover time period") in a playing time of the motion image data, a position (hereinafter, a "changeover determination position") in the screen, and any piece of motion image data (hereinafter, "changeover motion image data") among the plural pieces of motion image data, and with respect to a set associated with the play-target motion image data, the changeover unit changes over the play-target motion image data to the changeover motion image data when (a) the changeover time period includes a time point when the instruction input was received, and when (b) the changeover determination position and the position specified by the instruction input both satisfy a predetermined proximity condition.

That is, a time period and a position in the screen for changing over motion image data are set in each piece of motion image data. In motion image data currently played, when the player selects an appropriate position in the screen at an appropriate time period, motion image data associated with the time period of the currently-played motion image data and the position of the currently-played motion image data is played.

According to the present invention, it is possible to naturally change over a motion image currently played to another motion image through specifying a position in a screen of the motion image currently played.

Moreover, the receiving unit may set, based on an operation input given by the player, a position of an area that the player is focusing on (hereinafter, an "attention area") and a size of the attention area in the screen of the motion image data, and the changeover unit may determine a proximity condition based on the set position of the attention area.

The "attention area" is an area used by the player for specifying a position in the screen. It is possible to change the position of the attention area and the size thereof by an instruction through a controller.

For example, the player specifies the area in the screen where the motion image data is being played by moving a frame displayed in the screen through the controller. The changeover unit determines whether or not the specified area includes a position associated with changeover motion image data in the screen. Note that the attention area may not be displayed.

According to the present invention, the player can change over a motion image data currently played to another motion image data through specifying a position in a screen of the motion image currently played using a controller or the like.

Moreover, when the changeover determination position is included in the attention area, and when the size of the attention area is smaller than a predetermined threshold value, the proximity condition may be regarded as satisfied.

That is, when the changeover determination position is included in an area specified by the player, and when the size of the specified area is smaller than a predetermined planar dimension, motion image data associated with a time period of motion image data currently played and a position thereof currently played is played.

According to the present invention, no changeover of motion image data is carried out unless the player narrows down an area to be specified, so that any unintended changeover process can be avoided.

Moreover, the changeover determination position includes plural positions, and, when all of the changeover determination positions of a certain set among the sets are included in the attention area, and when none of the changeover determination positions of another set having a changeover time period overlapping the changeover time period of the certain set is included in the attention area, a proximity condition of the certain set may be regarded as satisfied.

That is, when an area specified by the player includes plural changeover determination positions in an appropriate combination and includes no excessive changeover determination position, motion image data associated with a time period of motion image data currently played and a position thereof currently played is played.

According to the present invention, no changeover of motion image data is carried out when an area specified by the player includes any changeover determination position of a different set, so that any changeover process to unintended motion image data can be avoided.

Moreover, when the set further includes an area (hereinafter, a "changeover determination area") including the changeover determination position, the changeover determination area is included in the attention area, and a percentage that the changeover determination area occupies the attention area is larger than a predetermined threshold value, the proximity condition may be regarded as satisfied.

That is, each piece of motion image data is further associated with an area including the changeover determination position. When an area specified by the player includes the changeover determination position, and is occupied by more than a predetermined planar dimension by an area associated beforehand, i.e., the changeover determination area, motion image data associated with a time period of motion image data currently played and the changeover determination position thereof data currently played is played.

According to the present invention, the changeover of motion image data is carried out after the player narrows down an area to be specified, so that any unintended changeover process can be avoided.

Moreover, the playing unit may enlarge a motion image to be played in the attention area and displays the enlarged motion image in the screen.

That is, an area specified by the player is enlarged so as to be zoomed and displayed in the screen.

According to the present invention, the player can recognize the changeover of motion image data through enlargement of a display image.

Moreover, the playing unit may display a figure representing the attention area while playing the play-target motion image data in the screen.

For example, in a motion image currently played, a rectangular frame is displayed as an area specified by the player. Note that the shape of the attention area is not limited to the rectangle, and can be any shape, such as a circle or a polygonal shape.

According to the present invention, the player can visually recognize a specified area with ease.

Moreover, when play-target motion image data is changed over by the changeover unit, the playing unit may enlarge a motion image to be played in the attention area among motion image data played prior to changeover as time advances, may play the motion image in the screen, and may start playing motion image data to be played after changeover.

For example, a positional misalignment of, for example, characters, is caused between an image of an area specified by the player and a leading image of a motion image to be played next, the changeover unit moves the image of the selected area so as to correct the positional misalignment while enlarging the image, and causes the enlarged image to match the leading image of the motion image to be played next.

According to the present invention, it is possible to naturally change over a motion image currently played to a motion image to be played next.

A game control method according to a second aspect of the present invention is executed by a game device comprising a playing unit, a receiving unit, and a changeover unit, comprises a playing step, a receiving step, and a changeover step, and is configured as follows.

In the playing step, the playing unit plays any piece of motion image data in a screen as play-target motion image data among plural pieces of motion image data.

In the receiving step, the receiving unit receives an instruction input of specifying a position in the screen.

In the changeover step, the changeover unit changes over the play-target motion image data based on the received instruction input.

Moreover, the plural pieces of motion image data include motion image data associated with a set of a time period (hereinafter, a "changeover time period") in a playing time of the motion image data, a position (hereinafter, a "changeover determination position") in the screen, and any piece of motion image data (hereinafter, "changeover motion image data") among the plural pieces of motion image data, and with respect to a set associated with the play-target motion image data, the changeover unit changes over the play-target motion image data to the changeover motion image data when (a) the changeover time period includes a time point when the instruction input was received, and when (b) the changeover determination position and the position specified by the instruction input both satisfy a predetermined proximity condition.

An information memory medium according to a third aspect of the present invention stores a program which causes a computer to function as a playing unit, a receiving unit, and a changeover unit.

The playing unit plays any piece of motion image data in a screen as play-target motion image data among plural pieces of motion image data.

The receiving unit receives an instruction input of specifying a position in the screen.

The changeover unit changes over the play-target motion image data based on the received instruction input.

Note that the plural pieces of motion image data include motion image data associated with a set of a time period (hereinafter, a "changeover time period") in a playing time of the motion image data, a position (hereinafter, a "changeover determination position") in the screen, and any piece of motion image data (hereinafter, "changeover motion image data") among the plural pieces of motion image data, and with respect to a set associated with the play-target motion image data, the changeover unit changes over the play-target motion image data to the changeover motion image data when (a) the changeover time period includes a time point when the instruction input was received, and when (b) the changeover determination position and the position specified by the instruction input both satisfy a predetermined proximity condition.

According to the present invention, a computer can function as the game device which operates as explained above.

Moreover, the information memory medium according to the present invention may be a computer-readable information memory medium, such as a compact disk, a flexible disk, a hard disk, a magneto-optical disk, a digital video disk, a magnetic tape, or a semiconductor memory.

According to the present invention, it is possible to provide the game device and the game control method which enable natural changeover of a motion image to be played next through specifying a position in a screen where a motion image is being played, and the information memory medium.

BRIEF DESCRIPTION OF THE DRAWINGS

A more complete understanding of this application can be obtained when the following detailed description is considered in conjunction with the following drawings, in which:

FIG. 4 is a diagram for explaining a correspondence relationship among a changeover time period, a changeover determination position, and changeover motion image data set in motion image data;

FIG. 7 is a diagram for explaining a correspondence relationship among the changeover time period, the changeover determination position, and the changeover motion image data set in the motion image data;

FIG. 9 is a diagram for explaining a correspondence relationship among the changeover time period, the changeover determination position, a changeover determination area, and the changeover motion picture data set in the motion image data;

FIG. 12 is a diagram for explaining changeover of screens of the motion image data.

DETAILED DESCRIPTION OF THE PREFERRED EMBODIMENT

An explanation will be given of an embodiment of the present invention. For ease of understanding, the embodiment that uses an information processing device for games to realize the present invention will be explained. However, the embodiment described below is provided to give explanations, and is not to limit the scope of the present invention. Consequently, those skilled in the art can adopt embodiments in which some of or all of the structural elements are replaced with respective equivalents, and it should be understood that such embodiments are also included within the scope of the present invention.

Embodiment

Figure 1:
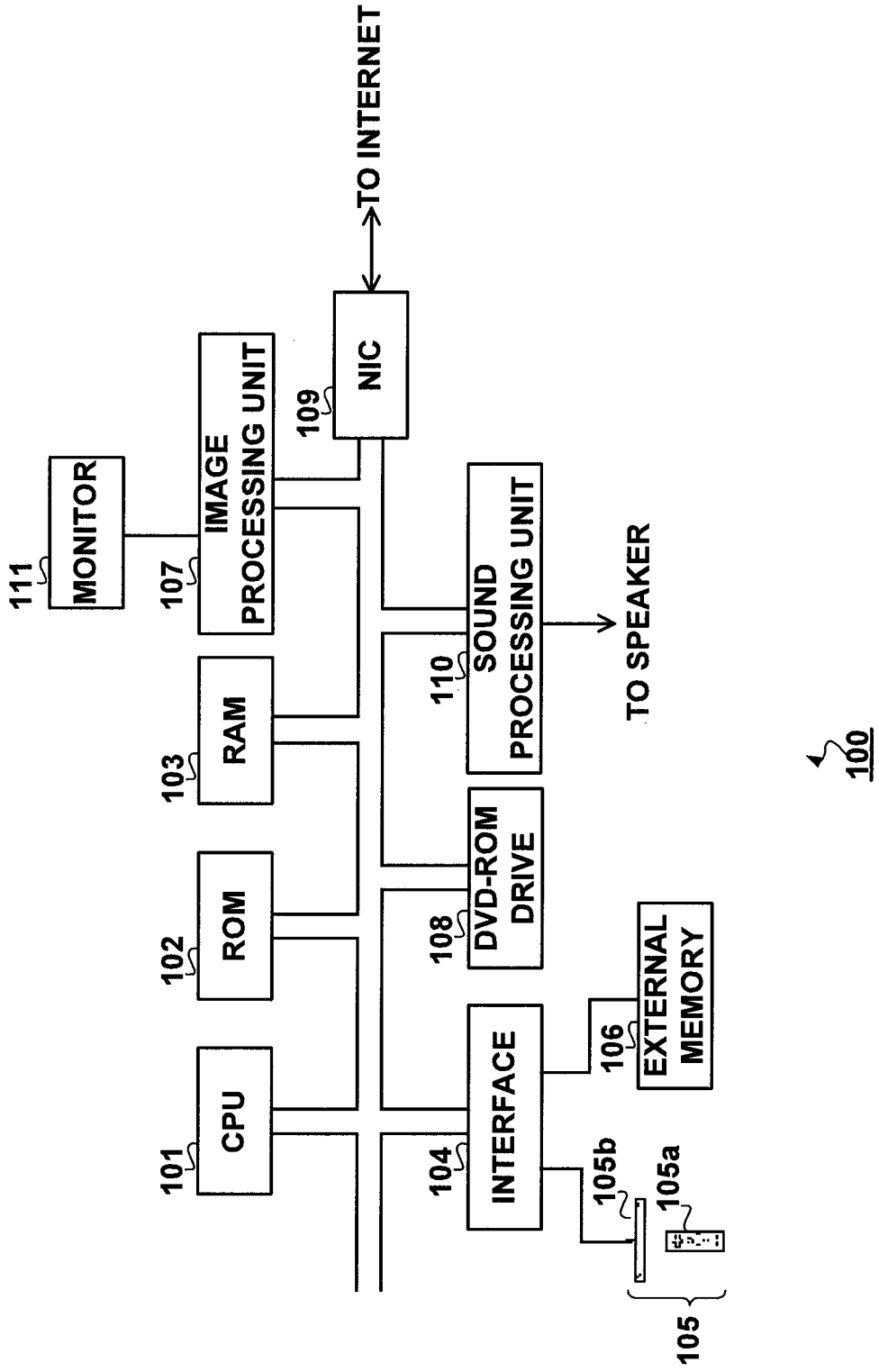
FIG. 1 is an exemplary diagram showing a general configuration of a typical information processing device which realizes a game device or the like according to an embodiment of the present invention.

FIG. 1 is an exemplary diagram showing a general configuration of a typical information processing device 100 which functions as a game device according to the embodiment of the present invention by running a program. An explanation will now be given with reference to this diagram.

The information processing device 100 comprises a CPU (Central Processing Unit) 101, a ROM (Read Only Memory) 102, a RAM (Random Access Memory) 103, an interface 104, a controller unit 105, an external memory 106, an image processing unit 107, a DVD-ROM (Digital Versatile Disc ROM) drive 108, an NIC (Network Interface Card) 109, a sound processing unit 110, and a monitor 111.

The CPU 101 controls the entire operation of the information processing device 100, and is connected to each structural element to exchange control signals and data therewith. Moreover, the CPU 101 has a register (not illustrated). The register is a memory area which allows a high-speed access thereto. The CPU 101 can perform various arithmetic operations to the resister using an ALU (Arithmetic Logic Unit) (not illustrated). Examples of such arithmetic operations are numerical operations, such as addition, subtraction, multiplication and division, logical operations, such as logical addition, logical multiplication, and logical negation, and bit operations, such as bitwise OR, bitwise AND, bit inversion, bit shift, and bit rotation. Furthermore, the CPU 101 may by itself be configured to be able to perform saturation calculations, such as addition, subtraction, multiplication and division, and vector operations like trigonometric functions, to execute high-speed multimedia processing. Moreover, the CPU 101 may realize these high-speed operations with a coprocessor.

An IPL (Initial Program Loader) which is executed immediately after the power is turned on is recorded in the ROM 102. As the IPL is executed, a program recorded in a DVD-ROM is read into the RAM 103. Thereafter, the CPU 101 starts running the program. An operating system program and various kinds of data are recorded in the ROM 102. The operating system is necessary for controlling the entire operation of the information processing device 100.

The RAM 103 is a temporary memory that stores data and programs. The RAM 103 retains programs and data read out from the DVD-ROM, other data necessary for game advancement and chat communications. Moreover, the CPU 101 has a variable area in the RAM 103. The CPU 101 may perform operations by directly working the ALU on the value stored as the variable. Furthermore, the CPU 101 may once store the value stored in the RAM 103 in the register to perform calculations thereon, and may write back the calculation result in the memory.

The controller unit 105 is connected via the interface 104. The controller unit 105 receives an operation input given by a user for executing a game. The controller unit 105 includes a controller 105a and a sensor bar 105b. For example, when a player performs an operation of swinging the controller 105a (a movement of waving a hand), the sensor bar 105b receives information on such operation, etc., through a wireless communication.

The external memory 106 is detachably connected via the interface 104. Data representing a play status (e.g., past scores) of a game or the like, data representing the progress status of a game, and log (record) data of chat communications in the case of a network match-up are stored in the external memory 106. As the player gives a necessary instruction input via the controller unit 105, those pieces of data are recorded as needed in the external memory 106. Note that the external memory 106 is rewritable.

The image processing unit 107 processes data read out from the DVD-ROM by means of the CPU 101 and an image computation processor (not illustrated) of the image processing unit 107. Next, the image processing unit 107 records image information acquired through such process in a frame memory (not illustrated). The frame memory is mounted on the image processing unit 107. The image information recorded in the frame memory is converted into video signals at predetermined synchronization timings, and output to the monitor 111 connected to the image processing unit 107. This enables various types of image display.

The DVD-ROM to be loaded in the DVD-ROM drive 108 records a program for realizing a game and image data and sound data accompanying the game. Under the control of the CPU 101, the DVD-ROM drive 108 performs a read-out process on the DVD-ROM loaded therein to read out a necessary program and data. The read-out program and data are temporarily stored in the RAM 103 or the like.

Moreover, the image computation processor can perform high speed overlay calculations of two-dimensional images, transparency calculation like α blending, and various saturate calculations.

When a virtual space is three dimensional, the image computation processor can also perform high speed calculations to obtain a rendered image. The rendered image is an image having a polygon arranged in the virtual space as viewed panoramically from a predetermined view position toward a predetermined direction of a visual line. The rendered image can be obtained by rendering of polygon information arranged in the three-dimensional space and affixed with various kinds of texture information by Z-buffering or the like.

Furthermore, the CPU 101 and the image computation processor can work together to depict letter strings as a two-dimensional image in accordance with font information. Note that the font information defines the shape of a letter. The image representing the letter strings is depicted in the frame memory or on each surface of a polygon.

The NIC 109 is an interface which intermediates between an Internet connecting device (not illustrated) and the CPU 101. The NIC 109 is used for connecting the information processing device 100 to a computer communication network (not illustrated) like the Internet. Such Internet connecting device is a 10BASE-T/100BASE-T compatible product used for establishing a LAN (Local Area Network), an analog modem, an ISDN (Integrated Services Digital Network) modem or an ADSL (Asymmetric Digital Subscriber Line) modem for connecting to the Internet via a telephone line, a cable modem for connecting to the Internet via a cable television line or the like.

The sound processing unit 110 converts sound data read out from the DVD-ROM into an analog sound signal, and outputs the converted data from a speaker (not illustrated) connected thereto. Moreover, under the control of the CPU 101, the sound processing unit 110 generates a sound effect or music data to be output in the progress of the game, and outputs sounds corresponding to such data from the speaker.

When the sound data recorded in the DVD-ROM is MIDI data, the sound processing unit 110 refers to sound source data to convert the MIDI data into PCM data. Note that the sound processing unit 110 has the MIDI sound source data. Moreover, when the sound data is compressed sound data in an ADPCM format, an Ogg Vorbis format or the like, the sound processing unit 110 extracts such data and converts it into PCM data. The sound processing unit 110 performs D/A (Digital/Analog) conversion on the PCM data at a timing corresponding to the sampling frequency of that data and outputs it from the speaker, thereby enabling sound output.

The monitor 111 is connected to the image processing unit 107. The CPU 101 and the image computation processor work together to display image information on the monitor 111. The monitor 111 may be an LCD (Liquid Crystal Display), an organic EL display (organic Electro-Luminescence display) or the like. The monitor 111 is used in the form of a general stand display or in the form of a mounting type HMD (Head Mounted Display).

Moreover, the information processing device 100 may use a large-capacity external memory device like a hard disk drive which is configured to function as, the ROM 102, the RAM 103, the external memory 106, the DVD-ROM loaded in the DVD-ROM drive 108, etc.

Although the above-explained information processing device 100 corresponds to a so-called "consumer video game device", any device which executes such an image process as displaying a virtual space can realize the present invention. Consequently, the present invention can be realized on various kinds of calculating machines, such as a cellular phone, a portable game machine, a karaoke device and a general business computer.

For example, like the information processing device 100, a general computer comprises a CPU, a RAM, a ROM, a DVD-ROM drive and an NIC. The general computer has an image processing unit with a simpler function than that of the image processing device 100, and also has a hard disk drive as an external memory device. The general computer can use a flexible disk, a magneto-optical disk, a magnetic tape, etc. Moreover, the general computer uses a keyboard and a mouse as input devices instead of using the controller unit 105.

Figure 2:
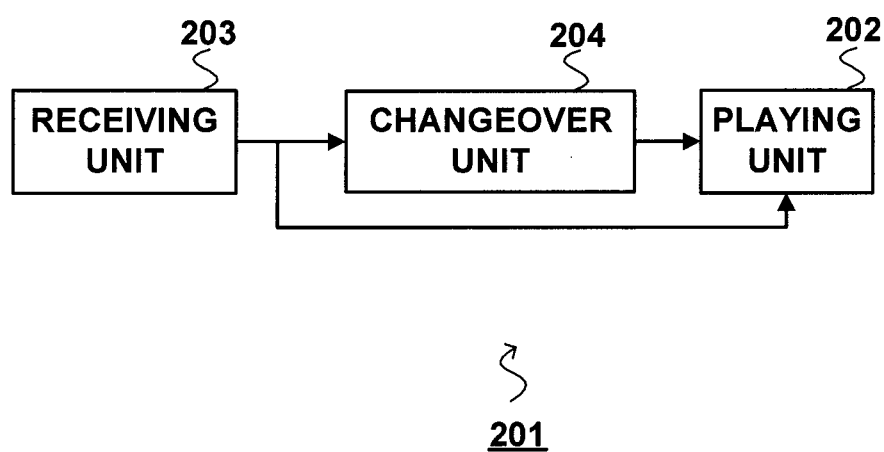
FIG. 2 is an explanatory diagram showing a functional configuration of the game device.

An explanation will be given of a functional configuration of the game device of the present embodiment realized on the information processing device 100 with reference to FIG. 2. As a DVD-ROM storing a program and data for games is loaded in the DVD-ROM drive 108 and the information processing device 100 is powered on, the program is run and the game device of the present embodiment is realized.

A game device 201 of the present embodiment has a playing unit 202, a receiving unit 203 and a changeover unit 204.

Figure 3A:
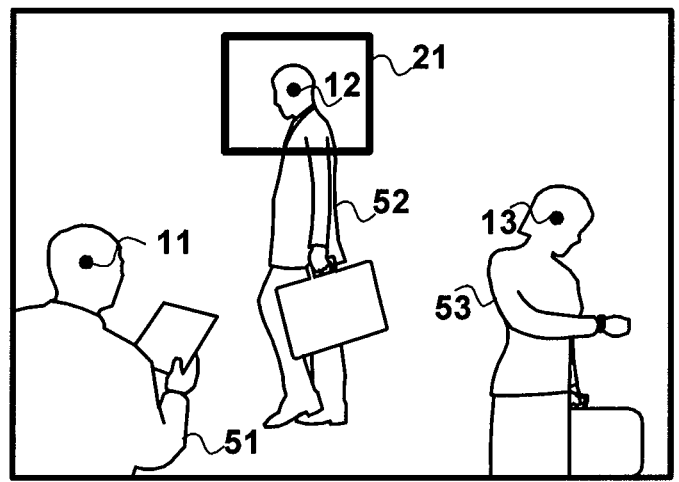
FIG. 3A is a diagram for explaining an instruction input given by a player.

The playing unit 202 plays any of motion image data among plural pieces of motion image data based on, for example, a selection by a player, and displays a motion image on a screen of the monitor 111. Motion image data A in FIG. 3A shows an example of a game image displayed by the playing unit 202. On the screen of the monitor 111 that the player is watching, three persons 51, 52 and 53 are projected. On the screen of the monitor 111, changeover determination positions 11 to 13 are set in respective areas where respective persons are displayed. These changeover determination positions 11 to 13 may be explicitly displayed as shown in FIG. 3A, or may not be displayed.

Consequently, the CPU 101 works together with the image processing unit 107 and the monitor 111 to function as the playing unit 202.

Figure 3B:
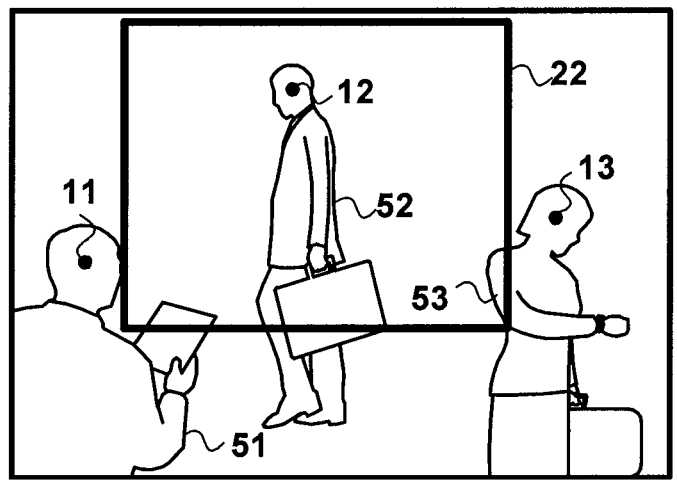
FIG. 3B is a diagram for explaining an instruction input given by the player.

The receiving unit 203 receives a position in the screen specified by the player through the controller 105a or the like as an instruction input. For example, as shown in FIG. 3A and FIG. 3B, with respect to frames 21 and 22 displayed on the screen, when the player changes a position and a size through the controller 105a or the like and specifies a changeover determination position 12, the receiving unit 203 receives such specification as an instruction input. In the present embodiment, the player selects an area through the rectangular frames 21, 22 displayed in the screen. However, the shape of the frame can be any shape, such as a circle or a polygonal shape. Moreover, a position in the screen may be specified with a point instead of the frame.

Consequently, the CPU 101 works together with the controller unit 105 to function as the receiving unit 203.

Figure 5:
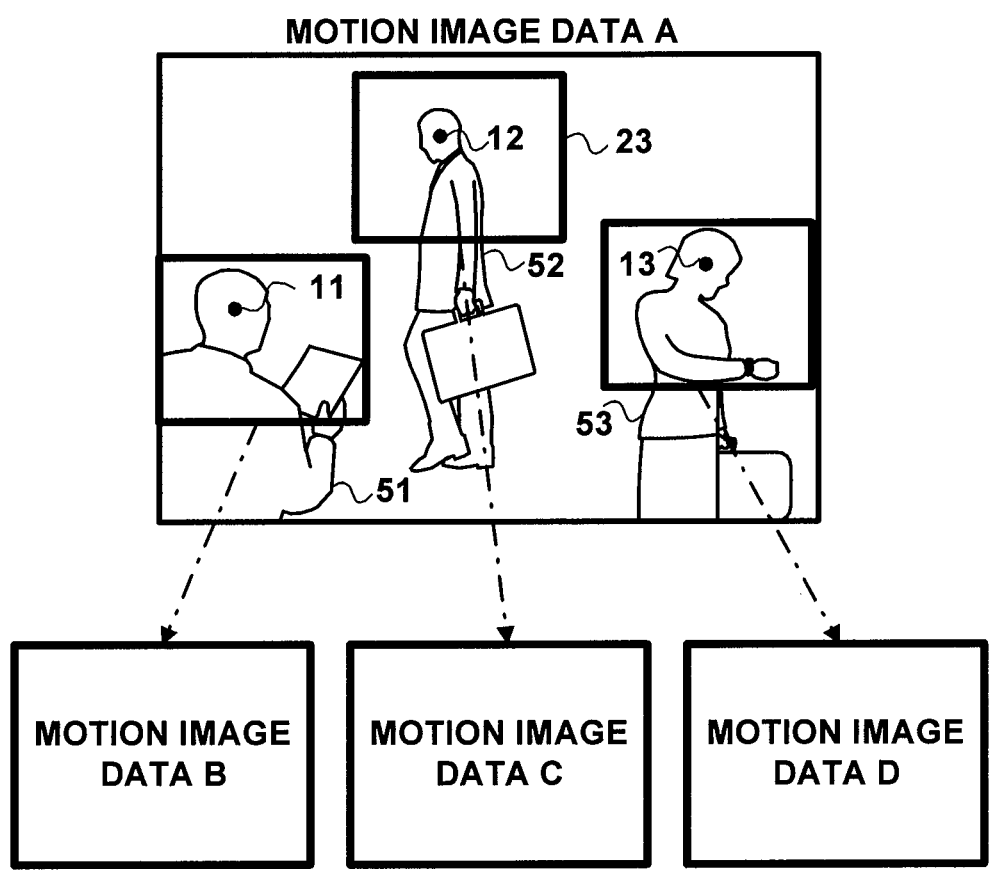
FIG. 5 is a diagram showing a relationship between the motion image data displayed by the game device and motion image data associated with a part of a motion image which is being played.

When the instruction input received by the receiving unit 203 satisfies conditions for changing over motion image data (changeover conditions), the changeover unit 204 changes over, based on the instruction input, motion image data being played (play-target motion image data) to changeover motion image data associated with the play-target motion image data. Each piece of motion image data read by the game device 201 from the DVD-ROM is associated with a set of a changeover time period, a changeover determination position, and changeover motion image data. For example, a correspondence relationship among a changeover time period, a changeover determination position, and changeover motion image data which are associated with the motion image data A is stored in the DVD-ROM as a table shown in FIG. 4. A changeover determination position 11 is represented by coordinates (x1, y1) in the screen, the changeover determination position 12 is represented by coordinates (x2, y2) in the screen, and a changeover determination position 13 is represented by coordinates (x3, y3) in the screen. When a changeover time period set in the play-target motion image data includes a time point when the instruction input was received, and a changeover determination position set in the play-target motion image data and a position specified through an instruction input both satisfy predetermined conditions, the changeover unit 204 changes over the play-target motion image data to changeover motion image data. The predetermined conditions are such that the changeover determination position is included in an area specified by the player, and the changeover determination position matches the position specified by the player. When the player changes the position and the size of the frame 21 and those of the frame 22 displayed on the screen and specifies any one of the changeover determination positions 11 to 13, the changeover unit 204 changes over the play-target motion image data to changeover motion image data associated with the selected changeover determination position. For example, as shown in FIG. 5, the changeover unit 204 takes motion image data B as the play-target motion image data when the changeover determination position 11 is specified, takes motion image data C as the play-target motion image data when the changeover determination position 12 is specified, and takes motion image data D as the play-target motion image data when the changeover determination position 13 is specified.

Consequently, the CPU 101 functions as the changeover unit 204.

Figure 6:
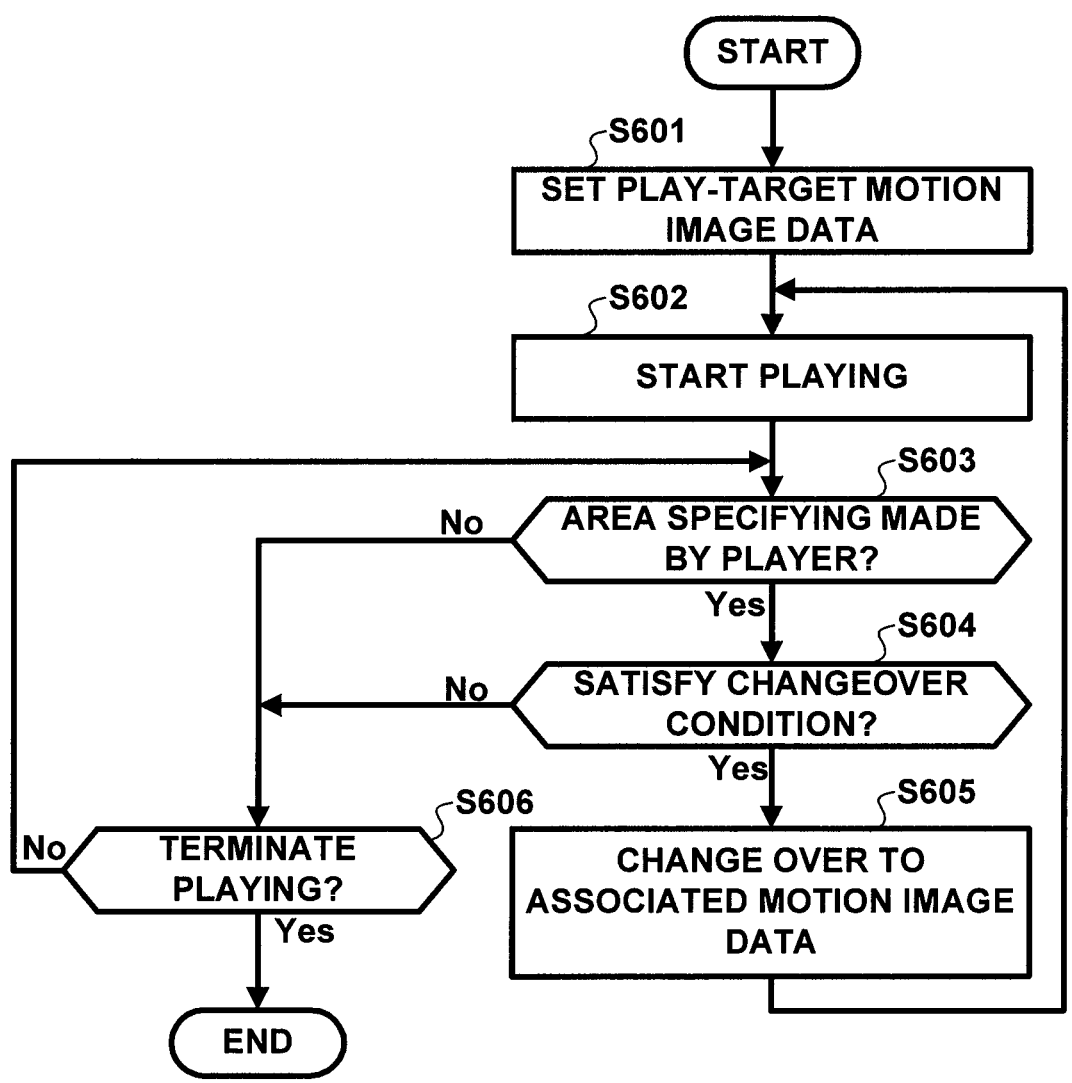
FIG. 6 is a flowchart for explaining a process executed by units of the game device of the present invention.

An explanation will be given of operations executed by individual units of the game device 201. As the game device 201 is powered on and a player starts a game, the CPU 101 starts a process shown in a flowchart of FIG. 6.

When the game starts, the playing unit 202 sets motion image data which is specified by the player or set automatically as the play-target motion image data (step S601). For example, when the motion image data A is set as the play-target motion image data, the playing unit 202 displays a game image of the motion image data A shown in FIG. 3A (step S602).

Next, the receiving unit 203 determines whether or not specifying an area in a screen is made by the player (step S603). For example, as shown in FIG. 3A, when the player changes the size of the frame 21 or the position thereof displayed in the screen through the controller 105a and specifies an area including the changeover determination position 12 in the screen, the receiving unit 203 determines that the area specifying is made (step S603; Yes). When determining that the area specifying is made (step S603; Yes), the receiving unit 203 transmits information on the position of the selected area and the range thereof to the changeover unit 204. When no area specifying is made (step S603; No), the CPU 101 detects whether or not the motion image data A has ended or whether or not an instruction of stopping the playing is given by the player, and the playing unit 202 determines whether or not to terminate the playing based on a detected result (step S606). When the motion image data A has ended or the instruction of stopping the playing is given by the player (step S606; Yes), the playing unit 202 stops playing the play-target motion image data. When the motion image data A has not ended yet and no instruction of stopping the playing is given by the player (step S606; No), the playing unit 202 keeps playing the play-target motion image data.

In the step S603, when the receiving unit 203 determines that the area specifying has been made and the changeover unit 204 receives the information on the position of the area specified by the player and the range thereof from the receiving unit 203, the changeover unit 204 determines whether or not those pieces of information satisfy changeover conditions (step S604).

When determining that a time point that the player specifies the area and the area specified by the player satisfy the changeover conditions (step S604; Yes), the changeover unit 204 changes over the play-target motion image data to changeover motion image data associated with the changeover time period including the time point when the player specified the area and a changeover determination position (step S605). The playing unit 202 starts playing the changeover motion image data as present play-target motion image data (step S602). When the timing that the player specified the area or the area specified by the player does not satisfy the changeover condition (step S604; No), the playing unit 202 determines, based on a notification from the CPU 101, whether or not to terminate the playing (step S606).

In the step S604, the changeover unit 204 employs the following changeover conditions.

When the time point that the player specified the area is included in the changeover time period set in the motion image data being played (a changeover condition 1), the area specified by the player includes any one of changeover determination positions associated with the changeover time period (a changeover condition 2), and the area specified by the player is smaller than a predetermined threshold value (a changeover condition 3), the changeover unit 204 changes over motion data being played to changeover motion image data associated with the changeover time period of the motion image data currently played and the changeover determination position thereof. Note that the changeover unit 204 may determine, based on only the changeover condition 1 and the changeover condition 2, whether or not the changeover conditions are satisfied.

For example, when the motion image data A shown in FIG. 3A, FIG. 3B and FIG. 5 is an image after 100 seconds have elapsed from the start of playing, there are three changeover determination positions 11 to 13 in the screen. Moreover, regarding respective planer dimensions of the frames 21, 22 and 23, it is presumed that the planer dimension of the frame 21 is the smallest, the planer dimension of the frame 22 is the largest, and the planer dimension of the frame 23 is between that of the frame 21 and that of the frame 22, and the planer dimension of the frame 23 is taken as a predetermined threshold value. It is also presumed that the player specifies an area including the changeover determination position 12 shown as the frame 21. In this case, as shown in FIG. 4, a time point when the player specified the area (100 seconds) is included in the changeover time period and the specified area includes the changeover determination position 12 and has a smaller planer dimension than that of the frame 23. Consequently, the changeover unit 204 determines that the time point when the player specified the area and the area specified by the player both satisfy the changeover conditions 1 to 3. The changeover unit 204 changes over the play-target motion image data to changeover motion image data (the motion image data C) associated with the changeover time period (80 to 120 seconds) and the changeover determination position 12.

Moreover, in the step S604, the changeover unit 204 may adopt a following changeover condition.

It is presumed that a changeover condition 4 is that an area specified by the player includes plural appropriate changeover determination positions associated with the changeover time period.

A set of changeover determination positions is configured by plural positions, and when a timing that the player specifies an area satisfies the changeover condition 1, and when the area specified by the player satisfies the changeover condition 4, it is presumed that the changeover unit 204 changes over the play-target motion image data to changeover motion image data associated with the changeover time period of the play-target motion image data and the changeover determination position thereof.

Figure 8A:
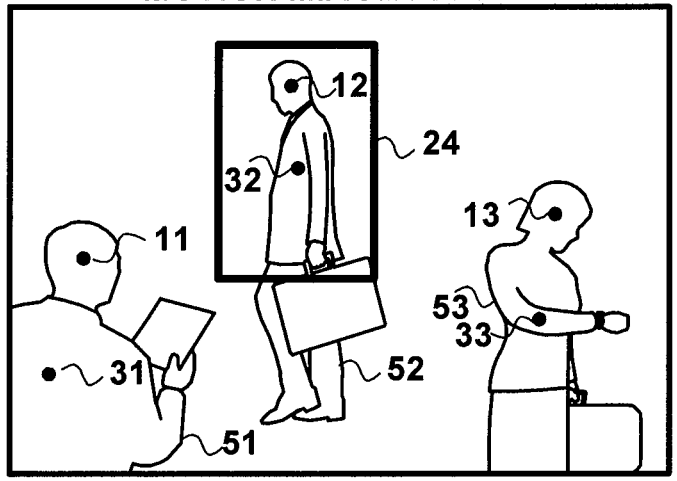
FIG. 8A is a diagram for explaining an instruction input given by the player.
Figure 8B:
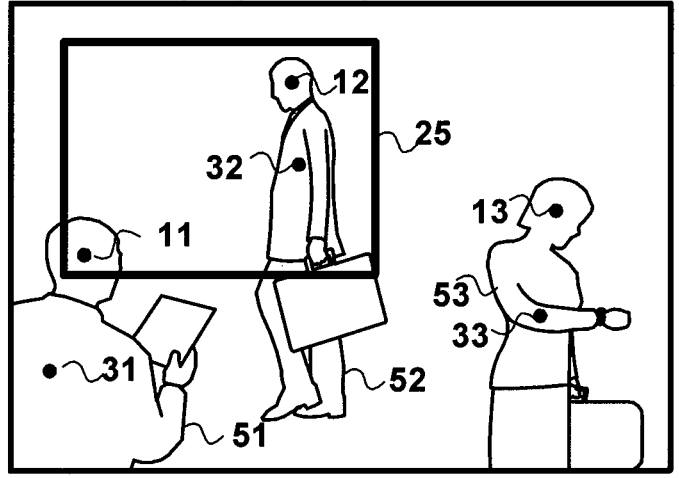
FIG. 8B is a diagram for explaining an instruction input given by the player.
Figure 8C:
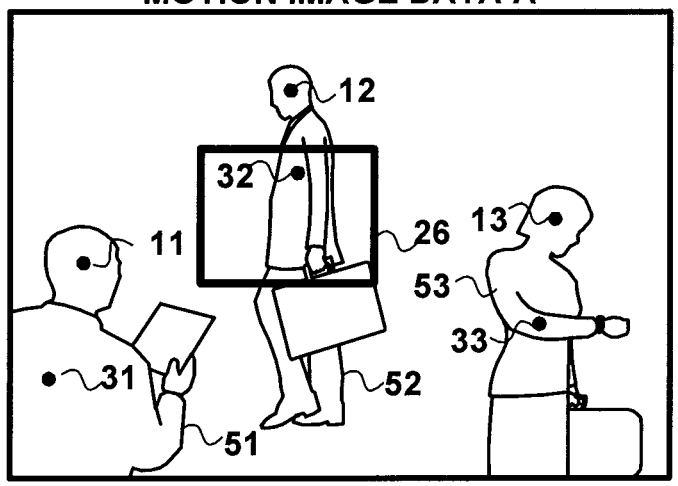
FIG. 8C is a diagram for explaining an instruction input given by the player.

For example, as shown in FIG. 7, the motion image data A is associated with plural changeover determination positions. In this case, the motion image data A shown in FIG. 8A to FIG. 8C is an image after 100 seconds have elapsed from the start of playing. In the screen of this image, there are six changeover determination positions 11 to 13, and 31 to 33. The changeover determination position 11 is represented by the coordinates (x1, y1) in the screen, the changeover determination position 12 is represented by the coordinates (x2, y2) in the screen, the changeover determination position 13 is represented by the coordinates (x3, y3) in the screen, the changeover determination position 31 is represented by coordinates (x1', y1') in the screen, the changeover determination position 32 is represented by coordinates (x2', y2'), in the screen, and the changeover determination position 33 is represented by coordinates (x3', y3') in the screen.

When the player specifies an area, shown as a frame 24 in FIG. 8A, including the changeover determination positions 12 and 32, as shown in FIG. 7, a time point when the player specified the area is included in the changeover time period, and the specified area (the frame 24) includes the changeover determination positions 12 and 32. Consequently, the changeover unit 204 determines that an instruction input given by the player satisfies the changeover conditions 1 and 4. The changeover unit 204 changes over the play-target motion image data to changeover motion image data (the motion image data C) associated with the changeover time period (80 to 120 seconds) and the changeover determination positions 12, 32. Conversely, as shown in FIG. 8B, when an area specified by the player (a frame 25) includes a different set of changeover determination positions, or as shown in FIG. 8C, when an area specified by the player (a frame 26) does not include both of the changeover determination positions 12 and 32, the changeover unit 204 does not execute a changeover process.

In the present embodiment, a set has two changeover determination positions, but the number of the changeover determination positions is not limited to this number, and can be any number as far as it is a plural number.

Moreover, in the step S604, the changeover unit 204 may adopt a following changeover condition.

In addition to the changeover time period, the changeover determination position, and the changeover motion image data, a changeover determination areas is associated with motion image data in a set.

It is presumed that a changeover condition 5 is that a specified area is occupied by equal to a predetermined percentage or larger by the changeover determination area.

When a time point that the player specifies an area satisfies the changeover condition 1, and when the specified area satisfies the changeover condition 2 and the changeover condition 5, it is presumed that the changeover unit 204 changes over the play-target motion image data to changeover motion image data associated with the changeover time period and the changeover determination position.

Figure 10A:
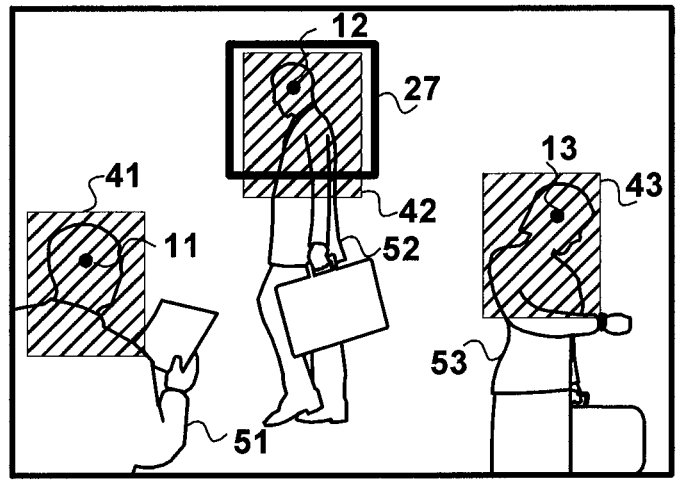
FIG. 10A is a diagram for explaining an instruction input given by the player.
Figure 10B:
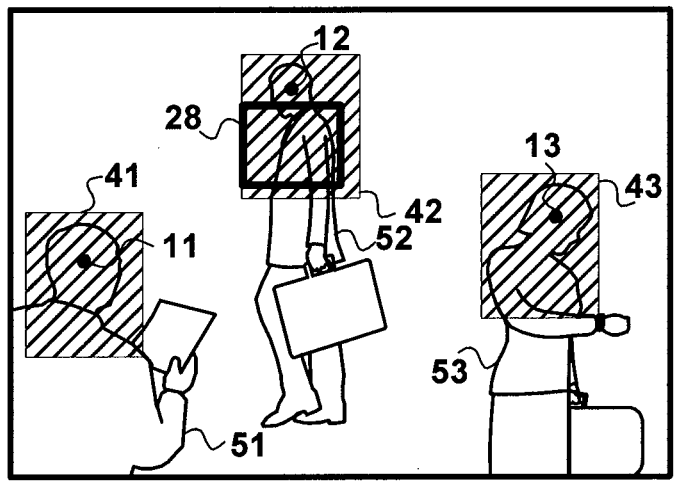
FIG. 10B is a diagram for explaining an instruction input given by the player.
Figure 10C:
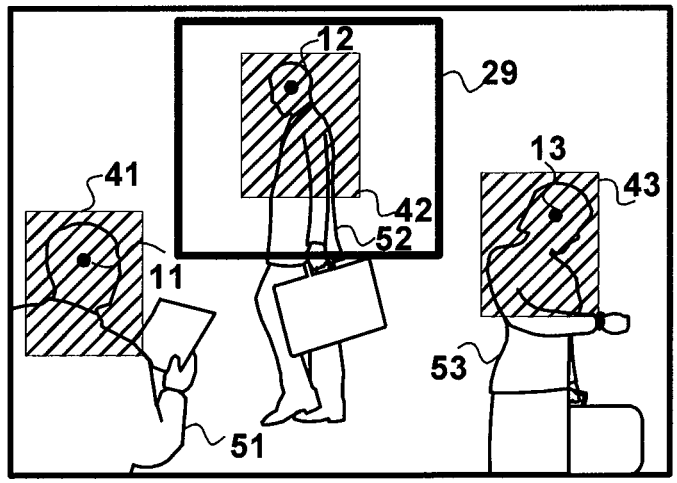
FIG. 10C is a diagram for explaining an instruction input given by the player.

For example, as shown in FIG. 10A, the motion image data A is associated with the changeover time period, the changeover determination position, the changeover determination area, and the changeover motion image data. In this case, when an image shown in FIG. 10A to FIG. 10C is the motion image data A after 100 seconds have elapsed from the start of playing, there are three changeover determination positions 11 to 13, and also three changeover determination areas 41 to 43 in the screen of this image. The changeover determination area 41 represents an area 1 shown in FIG. 9, the changeover determination area 42 represents an area 2, and the changeover determination area 43 represents an area 3. Moreover, the percentage of the changeover condition 5 is set to be 80 percent.

It is presumed that the player specifies the changeover determination area 42 including the changeover determination position 12 shown as a frame 27 in FIG. 10A. In this case, as shown in FIG. 9, a time point when the player specifies the area is included in the changeover time period, the specified area includes the changeover determination position 12, and the changeover determination area 42 occupies equal to 80 percent or larger of the area specified by the player (the frame 27). Consequently, the changeover unit 204 determines that an instruction input given by the player satisfies the changeover conditions 1, 2, and 5. The changeover unit 204 changes over the play-target motion image data to changeover motion image data (the motion image data C) associated with the set of the changeover time period (80 to 120 seconds), the changeover determination position 12, and the changeover determination area 42. Conversely, as shown in FIG. 10B, when an area specified by the player (a frame 28) does not include the changeover determination position 12, or as shown in FIG. 10C, when an area specified by the player (a frame 29) includes the changeover determination position 12 but is not occupied by equal to 80 percent or larger by the changeover determination area 42, the changeover unit 204 does not execute the changeover process of motion image data.

Figure 11:
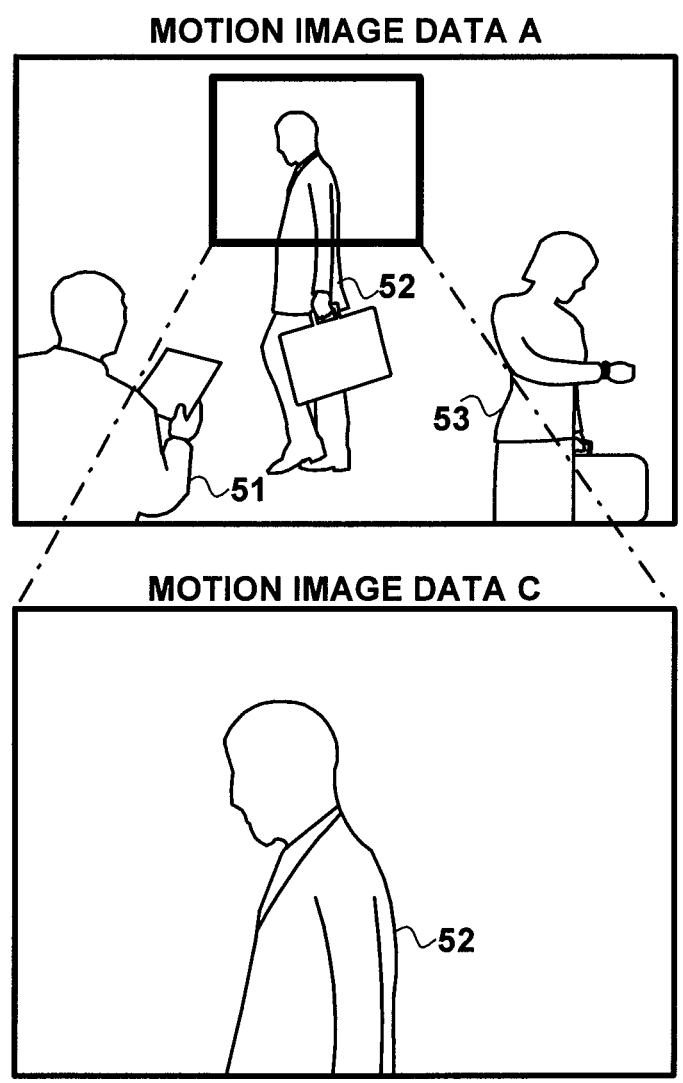
FIG. 11 is a diagram for explaining changeover of screens of motion image data.

Moreover, in changing over of motion image data from the step S602 to the step S605, as shown in FIG. 11, the changeover unit 204 gradually (as time advances) enlarges a specified area until it becomes the full screen size, and then changes over such area to new play-target motion image data.

Furthermore, as shown in FIG. 12, in the motion image data A, when an area specified by the player is enlarged as it is, if a positional misalignment is caused between the enlarged image and a leading image of the motion image data C which is new play-target motion image data, the changeover unit 204 may enlarge and correct the image of the motion image data A so as to match with the leading image of the motion image data C. In FIG. 12, although the person 52 is displayed at the rightmost end of an area specified through a frame 30, it is presumed that a position of the person 52 in the leading image of the motion image data C is leftmost end. In this case, if the image of the specified area is enlarged as it is, the position of the person 52 in the enlarged image of this area does not match the position of the person 52 in the leading image of the motion image data C. Consequently, the changeover unit 204 enlarges the specified area while shifting it to the right in the motion image data A, and eventually causes the image of the enlarged area to match the leading image of the motion image data C.

According to the present embodiment, the player can change over a motion image currently played to motion image data associated with an area in the motion image currently played through specifying such area. Moreover, the changeover of motion image data is carried out after the player narrows down an area to be specified, so that any unintended changeover process can be suppressed. Alternatively, when an area specified by the player includes a different set of changeover determination positions, no changeover of motion image data is carried out, thereby suppressing any changeover process to unintended motion image data. Furthermore, with respect to the changeover of screens, a specified screen is enlarged so as to be zoomed and a misalignment is corrected, resulting in natural changeover of motion image data.

Moreover, in the present embodiment, a frame which allows a player to change the position of the frame and the size thereof may be displayed in only a changeover time period. This enables the player to clearly figure out the changeover time period in the playing of motion image data.

According to the present invention, it is possible to provide the game device and the game control method which enable natural changeover of a motion image to be played next through specifying a position in a screen where a motion image is being played, and the information memory medium.

Having described and illustrated the principles of this application by reference to one preferred embodiment, it should be apparent that the preferred embodiment may be modified in arrangement and detail without departing from the principles disclosed herein and that it is intended that the application be construed as including all such modifications and variations insofar as they come within the spirit and scope of the subject matter disclosed herein.

What is claimed is:

1. A game device comprising:
a playing unit which plays any piece of motion image data in a screen as play-target motion image data among plural pieces of motion image data;
a receiving unit which receives an instruction input of specifying a position in the screen; and
a changeover unit which changes over the play-target motion image data based on the received instruction input,
the plural pieces of motion image data including motion image data associated with a set of a changeover time period in a playing time of the motion image data, a changeover determination position in the screen, and any piece of changeover motion image data among the plural pieces of motion image data, wherein
with respect to a set associated with the play-target motion image data, the changeover unit changes over the play-target motion image data to the changeover motion image data when
(a) the changeover time period includes a time point when the instruction input was received, and when
(b) the changeover determination position and the position specified by the instruction input both satisfy a predetermined proximity condition.

2. The game device according to claim 1, wherein
the receiving unit sets, based on an operation input given by a player, a position of an attention area that the player is focusing on and a size of the attention area in the screen of the motion image data, and
the changeover unit determines the proximity condition based on the set position of the attention area.

3. The game device according to claim 2, wherein
when the changeover determination position is included in the attention area, and when the size of the attention area is smaller than a predetermined threshold value, the proximity condition is satisfied.

4. The game device according to claim 2, wherein
the changeover determination position includes plural positions, and
when all of the changeover determination positions of a certain set among the sets are included in the attention area, and when none of the changeover determination positions of another set having a changeover time period overlapping the changeover time period of the certain set is included in the attention area, a proximity condition of the certain set is satisfied.

5. The game device according to claim 2, wherein
when the set further includes an changeover determination area including the changeover determination position,
the changeover determination area is included in the attention area, and
a percentage that the changeover determination area occupies the attention area is larger than a predetermined threshold value, the proximity condition is satisfied.

6. The game device according to claim 2, wherein
the playing unit enlarges a motion image to be played in the attention area and displays the enlarged motion image in the screen.

7. The game device according to claim 2, wherein
the playing unit displays a figure representing the attention area while playing the play-target motion image data in the screen.

8. The game device according to claim 7, wherein
when play-target motion image data is changed over by the changeover unit, the playing unit enlarges a motion image to be played in the attention area among motion image data played prior to changeover as time advances, plays the motion image in the screen, and starts playing motion image data to be played after changeover.

9. A game control method executed by a game device comprising a playing unit, a receiving unit, and a changeover unit, the game control method comprising:
a playing step in which the playing unit plays any piece of motion image data in a screen as play-target motion image data among plural pieces of motion image data;
a receiving step in which the receiving unit receives an instruction input of specifying a position in the screen; and
a changeover step in which the changeover unit changes over the play-target motion image data based on the received instruction input,
the plural pieces of motion image data including motion image data associated with a set of a changeover time period in a playing time of the motion image data, a changeover determination position in the screen, and any piece of changeover motion image data among the plural pieces of motion image data, wherein
with respect to a set associated with the play-target motion image data, the changeover unit changes over the play-target motion image data to the changeover motion image data when
(a) the changeover time period includes a time point when the instruction input was received, and when (b) the changeover determination position and the position specified by the instruction input both satisfy a predetermined proximity condition.

10. A non-transitory computer-readable information memory medium storing a program which causes a computer to function as:

a playing unit which plays any piece of motion image data in a screen as play-target motion image data among plural pieces of motion image data;

a receiving unit which receives an instruction input of specifying a position in the screen; and a changeover unit which changes over the play-target motion image data based on the received instruction input, the plural pieces of motion image data including motion image data associated with a set of a changeover determination time period in a playing time of the motion image data, a changeover determination position in the screen, and any piece of changeover motion image data among the plural pieces of motion image data, wherein with respect to a set associated with the play-target motion image data, the changeover unit changes over the play-target motion image data to the changeover motion image data when (a) the changeover time period includes a time point when the instruction input was received, and when (b) the changeover determination position and the position specified by the instruction input both satisfy a predetermined proximity condition.

\* \* \* \* \*

UNITED STATES PATENT AND TRADEMARK OFFICE
CERTIFICATE OF CORRECTION

PATENT NO. : 8,469,807 B2  
APPLICATION NO. : 12/877285  
DATED : June 25, 2013  
INVENTOR(S) : Takeshi Yamaguchi Page 1 of 1

It is certified that error appears in the above-identified patent and that said Letters Patent is hereby corrected as shown below:

In the Claims:

Column 15, lines 16-17, claim 10: Please delete the word "determination".

Signed and Sealed this
Twenty-seventh Day of August, 2013

Teresa Stanek Rea
*Acting Director of the United States Patent and Trademark Office*